(12) United States Patent
Hamilton, II et al.

(10) Patent No.: US 10,346,338 B2
(45) Date of Patent: Jul. 9, 2019

(54) USE OF PHYSICAL BLOCKS TO DEVELOP MICROSERVICES

(71) Applicant: INTERNATIONAL BUSINESS MACHINES CORPORATION, Armonk, NY (US)

(72) Inventors: Rick A. Hamilton, II, Charlottesville, VA (US); Jinho Hwang, Ossining, NY (US); Agueda Martinez Hernandez Magro, Jalisco (MX); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 194 days.

(21) Appl. No.: 15/464,963

(22) Filed: Mar. 21, 2017

(65) Prior Publication Data
US 2018/0276163 A1    Sep. 27, 2018

(51) Int. Cl.
| | |
|---|---|
| *G06F 9/54* | (2006.01) |
| *G06F 13/40* | (2006.01) |
| *G06F 9/445* | (2018.01) |
| *G06F 8/60* | (2018.01) |
| *H04L 29/08* | (2006.01) |

(52) U.S. Cl.
CPC ........... *G06F 13/4027* (2013.01); *G06F 8/60* (2013.01); *G06F 9/44505* (2013.01); *G06F 9/54* (2013.01); *H04L 67/10* (2013.01)

(58) Field of Classification Search
CPC .......... H04L 63/20; H04L 67/02; G16H 10/60
USPC ........................................................ 710/104
See application file for complete search history.

(56) References Cited

U.S. PATENT DOCUMENTS

| | | | |
|---|---|---|---|
| 9,047,189 B1 * | 6/2015 | Gupta | G06F 11/10 |
| 9,432,263 B2 | 8/2016 | Flavel et al. | |
| 2007/0282655 A1 * | 12/2007 | Jaluka | G06Q 10/06 705/7.14 |
| 2009/0019535 A1 | 1/2009 | Mishra et al. | |

(Continued)

OTHER PUBLICATIONS

Darren Wilson, "Getting Started With the Lego Mindsotrms EV3 Color Sensor," Youtube.com. URL: https://www.youtube.com/watch?v=8wzXlhEF7V4. Posted Sep. 12, 2013. Retrieved Oct. 27, 2016.

*Primary Examiner* — Titus Wong
(74) *Attorney, Agent, or Firm* — Cantor Colburn LLP; Rahan Uddin (57) ABSTRACT

A computer-implemented method includes detecting, using a processor, an arrangement of a plurality of blocks that are interconnected, where each block of the plurality of blocks is a physical block representing a corresponding atomic service. It is determined, using the processor, whether each atomic service represented by a block in the plurality of blocks is configured to communicate with each other atomic service represented by an other block with which the block is interconnected in the plurality of blocks. Based at least in part on determining that each atomic service represented by a block in the plurality of blocks is configured to communicate with each other atomic service represented by an other block with which the block is interconnected in the plurality of blocks, a microservice represented by the arrangement of the plurality of blocks is defined. The microservice is deployed.

20 Claims, 8 Drawing Sheets

(56) References Cited

U.S. PATENT DOCUMENTS

| | | | |
|---|---|---|---|
| 2012/0060165 A1* | 3/2012 | Clarke | G06F 9/5038 718/104 |
| 2013/0111027 A1 | 5/2013 | Milojicic | |
| 2014/0019392 A1 | 1/2014 | Buibas | |
| 2014/0297787 A1 | 10/2014 | Baugh | |
| 2015/0127828 A1* | 5/2015 | Bostick | H04L 43/04 709/224 |
| 2016/0085518 A1 | 3/2016 | I | |

* cited by examiner

USE OF PHYSICAL BLOCKS TO DEVELOP MICROSERVICES

BACKGROUND

The present invention relates in general to computer architectures and, more specifically, to the use of physical blocks to develop microservice computer architectures.

The term "microservice" describes an approach to computer architecture and application design in which a single application is developed as a suite of small services or components based on function definitions, each corresponding to one function definition, and each running in its own process and communicating by way of lightweight mechanisms. The small services or components are often referred to as "atomic services." Each atomic service is a lightweight component for independently performing a modular service. For example, an atomic service might receive and combine keywords, process an algorithm, or make a decision based on the result of algorithm processing.

Microservices often operate in a cloud computing environment and can be "born on the cloud," such that they combine existing cloud services into a resulting cloud service.

SUMMARY

According to an embodiment of this invention, a computer-implemented method includes detecting, using a processor, an arrangement of a plurality of blocks that are interconnected, where each block of the plurality of blocks is a physical block representing a corresponding atomic service. It is determined, using the processor, whether each atomic service represented by a block in the plurality of blocks is configured to communicate with each other atomic service represented by an other block with which the block is interconnected in the plurality of blocks. Based at least in part on determining that each atomic service represented by a block in the plurality of blocks is configured to communicate with each other atomic service represented by an other block with which the block is interconnected in the plurality of blocks, a microservice represented by the arrangement of the plurality of blocks is defined. The microservice is deployed.

In another embodiment, a system includes a memory having computer-readable instructions and one or more processors for executing the computer-readable instructions. The computer-readable instructions include detecting an arrangement of a plurality of blocks that are interconnected, where each block of the plurality of blocks is a physical block representing a corresponding atomic service. Further according to the computer-readable instructions, it is determined whether each atomic service represented by a block in the plurality of blocks is configured to communicate with each other atomic service represented by an other block with which the block is interconnected in the plurality of blocks. Based at least in part on determining that each atomic service represented by a block in the plurality of blocks is configured to communicate with each other atomic service represented by an other block with which the block is interconnected in the plurality of blocks, a microservice represented by the arrangement of the plurality of blocks is defined. The microservice is deployed.

In yet another embodiment, a computer-program product for composing a microservice includes a computer-readable storage medium having program instructions embodied therewith. The program instructions are executable by a processor to cause the processor to perform a method. The method includes detecting an arrangement of a plurality of blocks that are interconnected, where each block of the plurality of blocks is a physical block representing a corresponding atomic service. Further according to the method, it is determined whether each atomic service represented by a block in the plurality of blocks is configured to communicate with each other atomic service represented by an other block with which the block is interconnected in the plurality of blocks. Based at least in part on determining that each atomic service represented by a block in the plurality of blocks is configured to communicate with each other atomic service represented by an other block with which the block is interconnected in the plurality of blocks, a microservice represented by the arrangement of the plurality of blocks is defined. The microservice is deployed.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Conventionally, there is no systematic way to guide the development of cloud-born services with low complexity. Further, software designers are likely to be inexperienced in combining atomic services into microservices, and there is conventionally no systematic way to reskill software designers to enable them to create scalable, adaptive, and componentized applications in the microservices approach.

Turning now to an overview of aspects of the present invention, some embodiments of the invention provide a composition system configured to dynamically compose services, such as infrastructure as a service (IaaS), platform as a service (PaaS), or software as a service (SaaS) services, based on assemblies of sensor-augmented physical components. The physical components, or blocks, may each represent an atomic service. When arranged by a user, the blocks can therefore together represent a microservice. In some embodiments, the composition system constructs the microservice represented by the arrangement of blocks, notifying of any errors in the case of missing or insufficient interfaces between atomic services represented by interconnected blocks. Use of the blocks can allow recognition of patterns not seen in logical representations, and can further allow ease of assembly and replacement in various contexts.

Figure 1:
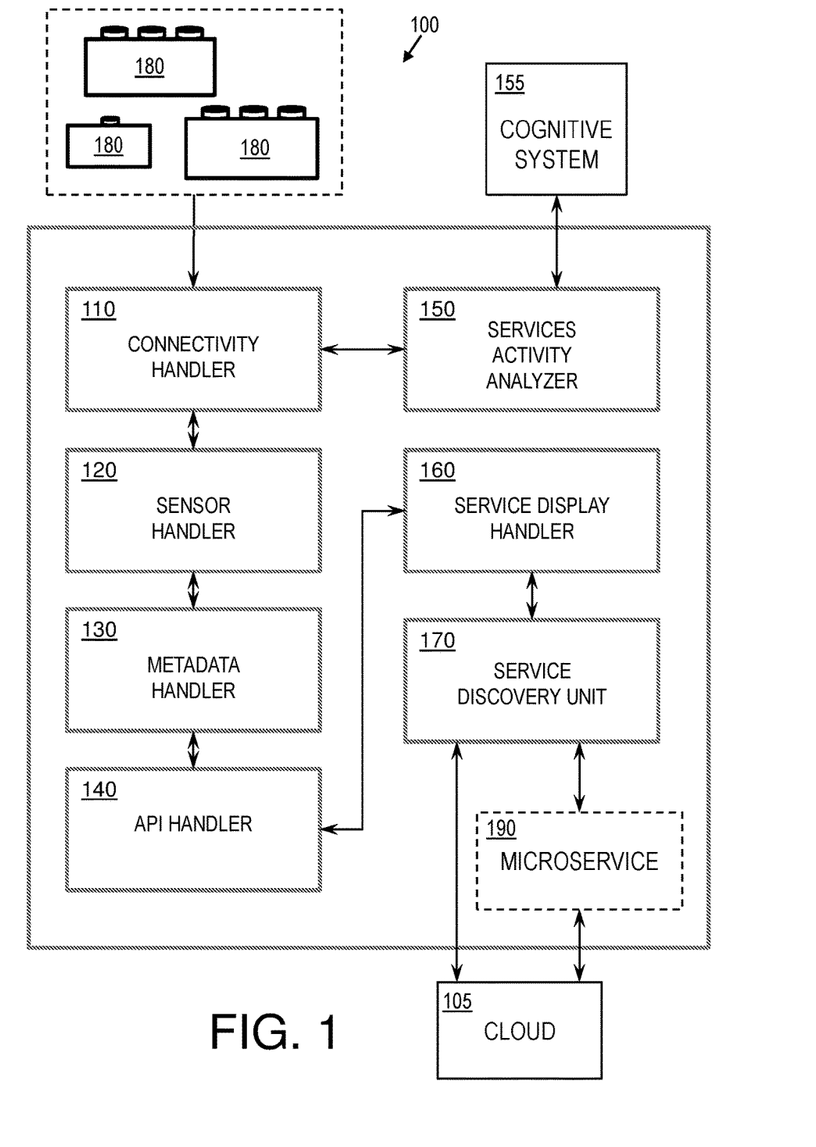
FIG. 1 is a diagram of a composition system according to some embodiments of this invention.

FIG. 1 is a block diagram of a composition system 100, according to some embodiments of this invention. As shown, the composition system 100 may take as input a configuration of blocks 180, which can be arranged manually by a software designer or other user. The composition system 100 may output a microservice 190. This output may go to a display for user to view, to a printer, or to a cloud, where the microservice 190 may be useable as a cloud service. Specifically, if the microservice 190 is made up of existing atomic services already deployed to a cloud 105, output of the service may include deployment of a definition of the microservice 190, thereby making the microservice 190 useable by others with access to the cloud 105.

In some embodiments, the composition system 100 includes one or more of the following, each of which may include hardware, software, or a combination of both: a connectivity handler 110, a sensor handler 120, a metadata handler 130, an application programming interface (API) handler 140, a service activity analyzer 150, a service display handler 160, and a service discovery unit 170. Although these components are illustrated in FIG. 1 as being distinct, it will be understood that this need not be the case, and these components may alternatively be grouped in various ways or further divided. Further, in some embodiments, the connectivity handler 110, the sensor handler 120, the metadata handler 130, the API handler 140, the service activity analyzer 150, the service display handler 160, and the service discovery unit 170 are integrated into a computer.

The connectivity handler 110 may manage a connection between the composition system 100 and the blocks 180 and, as a result, may detect a current configuration of the blocks 180. After a connection is established, the sensor handler 120 may obtain information from the block 180, specifically, from sensors in the blocks 180, to determine how the blocks 180 are connected to one another. Based on the detected connections, the metadata handler 130 may identify the appropriate interfaces needed for each connection between blocks. The API handler 140 may expose or display the appropriate interfaces using reading specifications. The services activity analyzer 150 may connect to cognitive systems 155, such as International Business Machines® (IBM) Watson®, and may use such systems to gather feedback for composing new service solutions, examining other service solutions, or learning from user interactions with service components represented by the blocks 180. The service display handler 160 may display to the user information about atomic services available and how those atomic services are represented by the blocks 180. The services discovery unit 170 may connect to existing services, such as PaaS services, such as IBM Bluemix®, to expose recently created services for PaaS users.

Figure 2A:
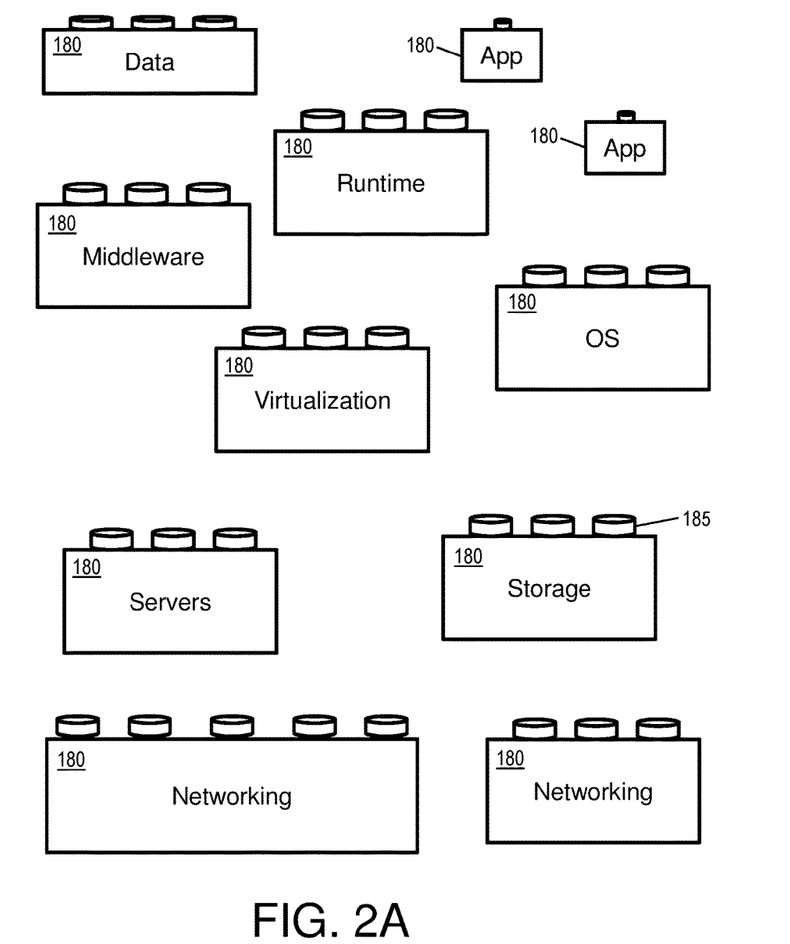
FIG. 2A illustrates blocks useable by the composition system to create a microservice according to some embodiments of this invention.
Figure 2B:
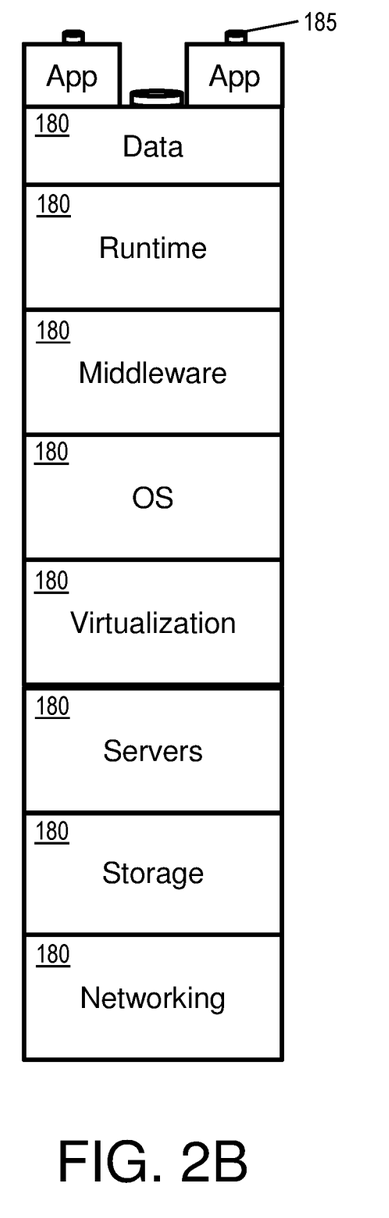
FIG. 2B illustrates blocks useable by the composition system to create a microservice, according to some embodiments of this invention.

FIGS. 2A-2B illustrate an example set of blocks 180 available for use by a user, such as a software designer or developer, according to some embodiments of this invention. Each block 180 may be associated with and may represent an atomic service. The blocks 180 may take many forms. For example, and not by way of limitation, each block 180 may be a modified toy building brick, or may be some other form of interconnectable piece manipulable by human tools or hands. For instance, to enable interconnection, each block 180 may include one or more physical projections and one or more receivers, or holes, such that the projections of one block 180 fit into the receivers of the other blocks 180. In some embodiments, each block 180 is colored in correspondence with the atomic service it represents. In this case, there may be a one-to-one correspondence between colors and atomic services, such that based on a color, the atomic service represented by a block 180 may be uniquely determined.

Each atomic service may have a service interface, or API, which may define expected input and output, as well as any applicable preconditions and postconditions for use of the atomic service. This interface may enable another atomic service to easily communicate with the atomic service in question, by simply meeting the precondition and supplying the input in the required format.

In some embodiments, each block 180 includes a memory card containing metadata that identifies itself to other aspects of the composition system 100. For example, and not by way of limitation, that metadata may identify the corresponding atomic service as well as the interface to access the atomic service. Further, each block 180 may include wireless communication capability, such as WiFi or Bluetooth. As such, each block may communicate with other aspects of the composition system 100 as needed.

Each block 180 may include one or more sensors 185 for detecting whether it is connected to other blocks 180 and, more specifically, which other blocks 180 it is connected to. For ease of illustration, only one sensor 185 is provided with a reference number in FIGS. 2A-2B. In some embodiments, a first block 180 and a second block 180 are deemed connected when they are interconnected, or are in sufficient proximity, either top to bottom or side to side. However, in some other embodiments, a first block 180 and a second block 180 are deemed connected only when they are attached together, or are in sufficient proximity, top to bottom. Specifically, each sensor 185 of a block 180 may include a color detector, enabling that sensor 185 to detect the color of the blocks 180 to which the block 180 in question is connected. Thus, by detecting the color of a connected other block 180, a specific atomic service of the connected other block 180 may be determined.

As shown, FIG. 2A illustrates the blocks 180 without any particular arrangement. In this example, the blocks 180 represent the following atomic services, as labeled in FIG. 2A: networking, storage, servers, virtualization, operating system (OS), middleware, runtime, data, and application (App). Specifically, in some embodiments, each distinct application is associated with a corresponding block 180.

FIG. 2B illustrates an example arrangement of these blocks 180 to compose a microservice 190 according to some embodiments. As shown, the blocks 180 may be stacked in the following order, from bottom to top: networking, storage, servers, virtualization, OS, middleware, runtime, data, and applications. A user may connect the blocks 180 together in this manner, as shown or in other arrangements, to represent a microservice made up on the atomic services represented by the arranged blocks 180. In other words, to construct a micrososervice, in the example of FIG. 2B, the user connects the blocks together 180 by stacking them as shown. The composition system 100 may then receive from the blocks 180 notification of the connections between blocks 180, which define a microservice, and the composition system 100 may therefore formally define that microservice using the existing interfaces of the applicable atomic services.

In this case, each pair of blocks 180 connected together may represent a pair of respective components, such as atomic services, each having an interface connectable to a complementary interface of the other component in the pair. For instance, the networking block 180 is connected to the storage block 180 in this example. Thus, the networking block 180 may represent a set of one or more networks having an interface for communicating with a storage component, represented by the storage block 180.

Figure 3:
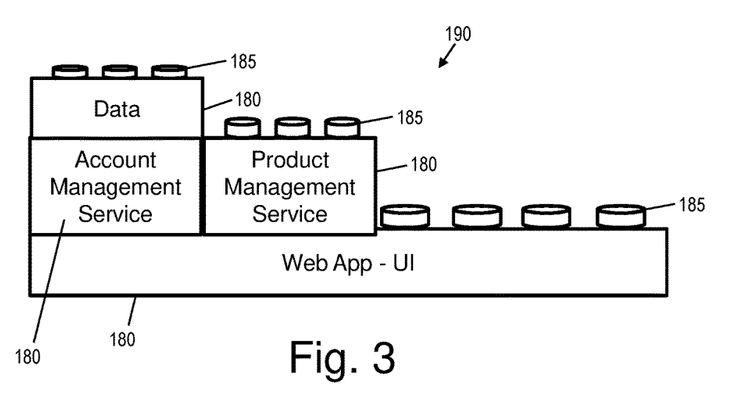
FIG. 3 is a diagram of a set of blocks arranged to represent a microservice according to some embodiments of this invention.

FIG. 3 illustrates another example arrangement of blocks 180, representing a microservice, according to some embodiments. As shown, the blocks 180 used may differ from those shown in the example of FIGS. 2A-2B. Specifically, in this example, a full set of blocks 180 available may include, among others, blocks 180 representing atomic services for a web application user interface, an account management service, a product management service, and data. Further, as shown, a user may arrange those blocks 180 to place the account management service and product management service in parallel in communication with the web application user interface, and may place the data in communication with the account management service. Given this arrangement, the composition system 100 may formally define a microservice, useable by others because the atomic services already exist in the cloud 105.

When the blocks 180 are arranged together, as shown in FIG. 2B, FIG. 3, or otherwise, the sensors 185 on the blocks 180 may detect which blocks 180 are connected together. The blocks 180 may then transmit indications of these connections to another aspect of the composition system 100, such as to the connectivity handler 110. More specifically, for instance, each block 180 may transmit a report indicating the other blocks 180 with which it is connected. The composition system 100 may receive the indications from the blocks 180, and may thus compile a list of connected pairs of blocks 180. Each such connected pair may represent a pair of atomic services desired by the user to be in communication with each other in the microservice 190 represented by the arrangement of blocks 180.

As discussed above, each atomic service may have an interface. For instance, an application may include an interface for communicating with a set of data, and a server may have an interface for communicating with a virtualization service. The composition system 100 may have access to information about each atomic service represented by a block 180. Thus, upon receiving information about the connected pairs of blocks 180, the composition system 100 may determine whether an interface exists enabling each pair of atomic services, represented by each connected pair of blocks 180, to communicate with one another. If it is determined that a pair of atomic services represented by a connected pair of blocks 180 is unable to communicate with each other, due to lacking the applicable interfaces, the composition system 100 may indicate an error.

Specifically, indicating an error may be performed by various mechanisms. For example, and not by way of limitation, an alert may be output to a display or to a printer notifying which pair of blocks 180, or which associated atomic services, lack the applicable interfaces. Upon receiving the error indication, a software developer may modify the atomic services as needed, such as by way of manual coding. For instance, the software developer may modify the existing atomic services or interfaces to enable the desired communication. The atomic services may then be updated, and the composition system 100 may receive updated information describing the atomic services. More specifically, for example, if the atomic services preexist in a cloud, then the updates may be deployed to the cloud, and further, any metadata stored on the corresponding blocks 180 may be updated as needed.

In some embodiments, if no errors are found (e.g., all pairs of atomic services representing connected pairs of blocks 180 have the necessary interfaces), then the atomic services that need to communicate with one another are already configured to do so. Thus, when no errors are found, the composition system 100 may deploy the microservice 190 represented by the blocks 180. This may be performed by exposing the new interface microservice 190 for use, such as by formally defining that microservice 190 and deploying the definition to the cloud 105. In some embodiments, this deployment is performed only after confirmation from the user.

Further, in some embodiments, the composition system 100 detects when the arrangement of blocks 180 changes, such as by the blocks 180 transmitting any new or removed connections among themselves. In this case, the composition system 100 may once again check for errors.

Some embodiments of the composition system 100 can be used to build infrastructure as a service (IaaS), PaaS, or software as a service (SaaS) services. Each of IaaS, PaaS, and SaaS can include networking, storage, servers, virtualization, OS, middleware, runtime, data, and applications. In the case of IaaS, a provider generally composes and manages networking, storage, servers, and virtualization, while a customer composes and manages the OS, middleware, runtime, data, and applications. In the case of PaaS, the customer generally manages only the data and applications. Lastly, in the case of SaaS, the provider generally manages all of these components. In each of these cases, however, some entity must determine how to fit together these various components, which can be implemented by atomic services. Further, in the case of IaaS and PaaS, the customer must also determine how to build their own components on top of the provider's.

According to some embodiments, designers, working on behalf of either the provider or the customer, can arrange the blocks 180 in such a way that no errors are produced, or may address any errors by modifying the applicable atomic services. As a result, an IaaS, PaaS, or SaaS service may be developed through the assistance of the blocks 180, which provide haptic feedback and easily visible and comprehendible structures in their arrangement.

Further, regardless of the type of service being built, a designer can easily arrange and rearrange the blocks 180, and thus the corresponding atomic services, to modify the size of a resulting microservice 190, to modify which atomic services are used, and to reduce or eliminate errors. Thus, in many cases, the composition system 100 acts as a useful tool for composing and recomposing services efficiently to meet desired goals.

In some circumstances, it may be determined that a new atomic service is needed. In that case, a developer can generate the code for the new atomic service, deploy the new atomic service to the cloud 105, and expose the interface for the new atomic service. Due to the exposed interface, the composition system 100 may detect that the new atomic service exists. Further, as other new atomic services are added to the cloud and their interfaces exposed, the composition system 100 may detect those as well. For example, in some embodiments, the composition system 100 may monitor the cloud 105 to detect new atomic services. The composition system 100 may then program an unused block 180 to represent the new atomic service. This programming may include, for example, updating the metadata stored in the block 180 to include identifying information about the new atomic service. Further, as needed, a user may color the block 180 to correspond to the applicable type of the new atomic service. Users may then use the newly programmed block 180 along with other blocks 180 of the composition system 100.

Figure 4:
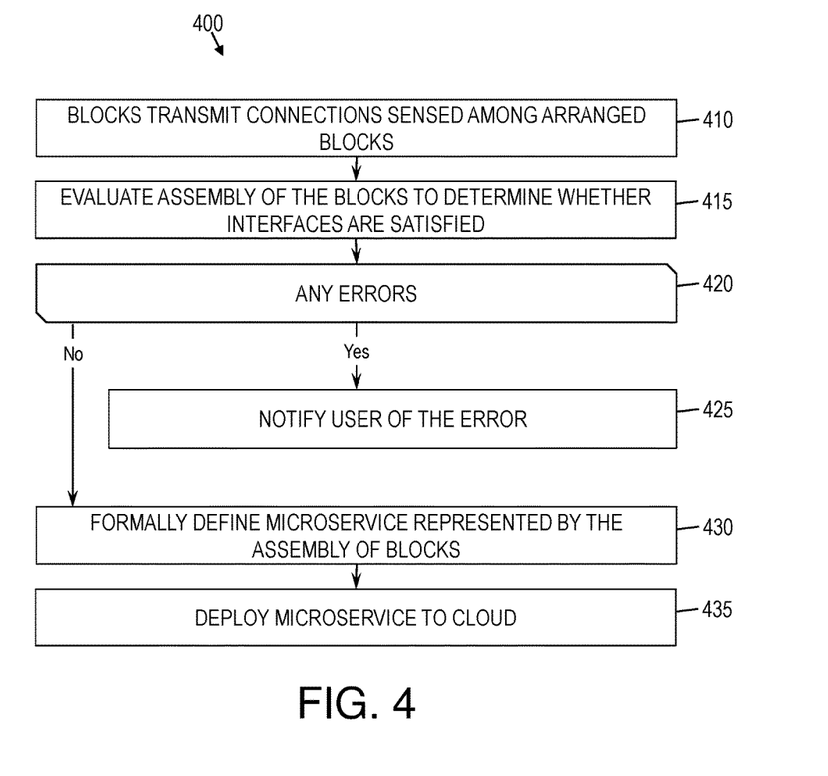
FIG. 4 is a flow diagram of a method for creating a microservice according to some embodiments of this invention.

FIG. 4 is a flow diagram of a method 400 for developing a microservice 190, according to some embodiments of this invention. Before the method 400 begins, a user arranges one or more blocks 180 to represent a desired microservice 190 made up of the atomic services associated with the blocks 180. As shown in FIG. 4, at diagram block 410, the blocks 180 may transmit to other aspects of the composition system 100, such as to the sensor handler 120, indications of the various connections between the arranged blocks 180.

At diagram block 415, the composition system 100 may evaluate the assembly of blocks 180 to determine whether all necessary interfaces are satisfied. In other words, for instance, the composition system 100 may ensure that, for each first atomic service represented by a block 180, each other atomic service represented by a connected block 180 has an interface configured to communicate with the first atomic service. For example, and not by limitation, if a first atomic service and a second atomic service are desired to be connected, as deemed by a connection between the corresponding blocks 180, it may be determined whether the output of the first atomic service meets the requirements of the input of the second atomic service, and vice versa. At decision diagram block 420, it may be determined whether any errors exist. Specifically, an error may occur when the requirements of an interface of at least one of the atomic services represented by the blocks 180 in the arrangement are not met.

If an error occurs, then at diagram block 425 the composition system 100 may notify a user of that error. However, if no error occurs, then at diagram block 430, the microservice 190 represented by the arrangement may be defined. For example, this may include generating a formal service definition, including operation of the microservice 190 and describing the interface. At diagram block 435, the definition of the microservice 190 may be output, such as being deployed to the cloud 105 for others to use.

Figure 5:
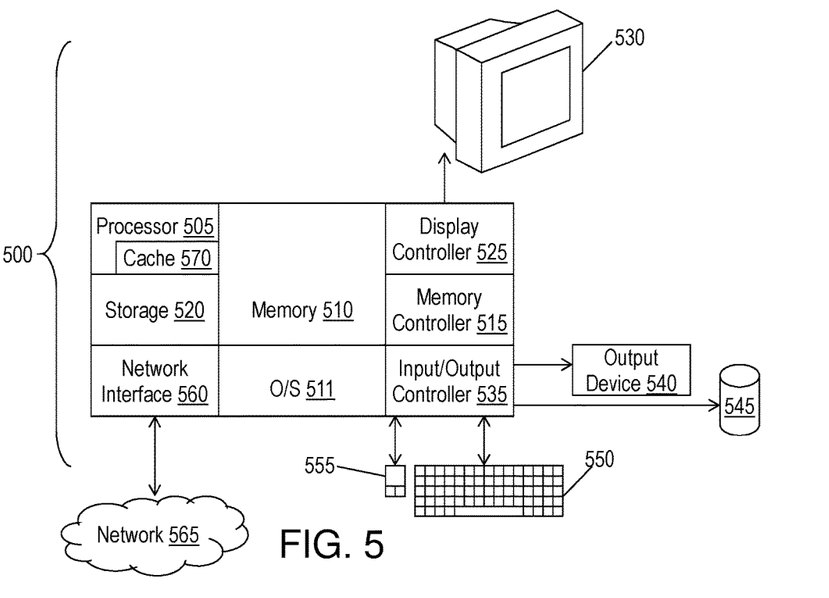
FIG. 5 is a diagram of a computer system for implementing some or all aspects of the composition system according to some embodiments of this invention.

FIG. 5 illustrates a block diagram of a computer system 500 for use in implementing a composition system 100 or method according to some embodiments. The composition systems 100 and methods described herein may be implemented in hardware, software (e.g., firmware), or a combination thereof. In some embodiments, the methods described may be implemented, at least in part, in hardware and may be part of the microprocessor of a special or general-purpose computer system 500, such as a personal computer, workstation, minicomputer, or mainframe computer.

In some embodiments, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the composition systems 100 and methods of this disclosure.

The computer system 500 may further include a display controller 525 coupled to a display 530. In some embodiments, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Composition systems 100 and methods according to this disclosure may be embodied, in whole or in part, in computer program products or in computer systems 500, such as that illustrated in FIG. 5.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
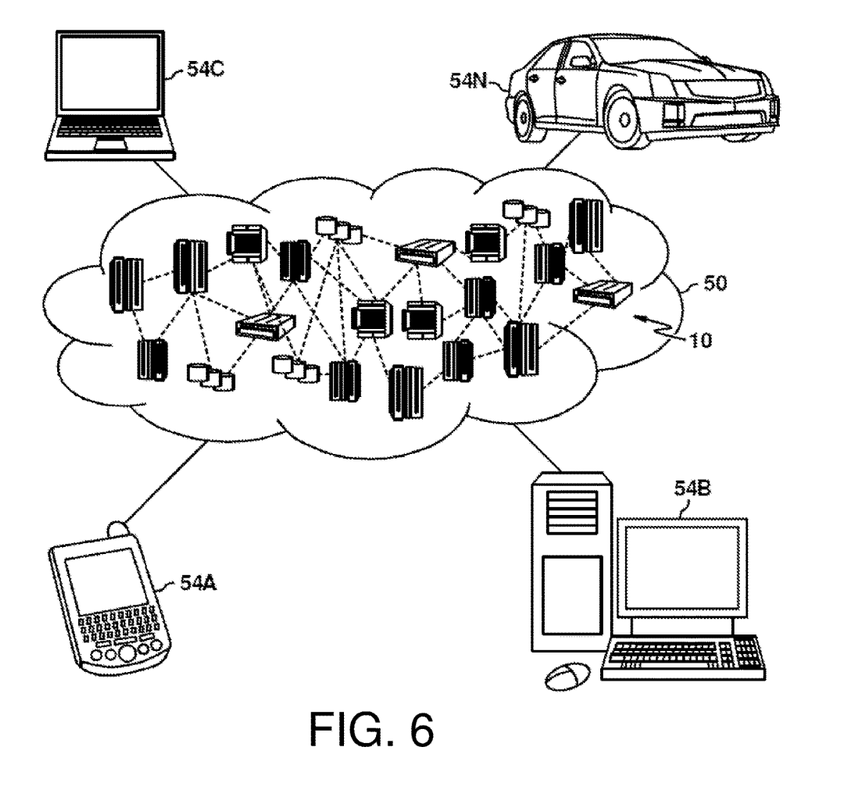
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
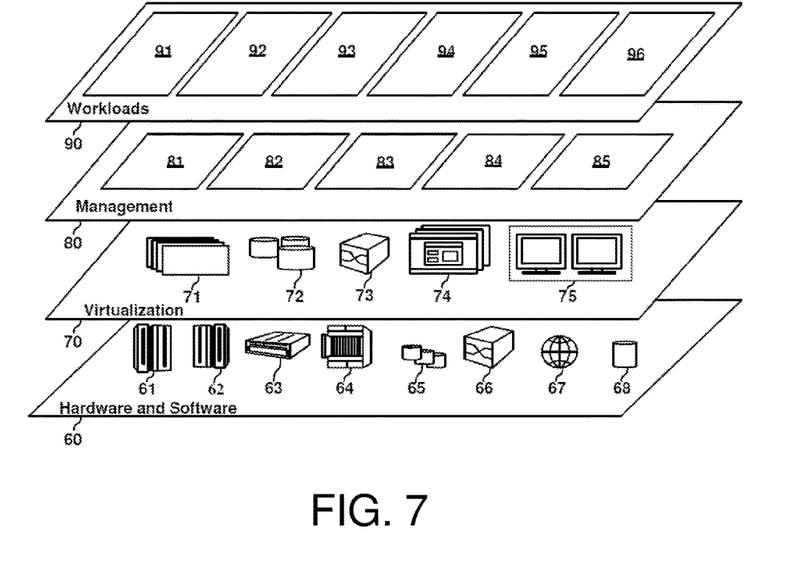
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and microservice composition 96.

Technical effects and benefits of some embodiments include simplifying the process of building microservices 190, by enabling users to see and manipulate configurations through physical contact with three-dimensional shapes. This permits a new way of viewing, understanding, and optimizing designs, because the blocks 180 can proved a rich development experience with both visual and haptic feedback. By way of the composition system 100, users can actively learn composable patterns through their own and others' interactions with physical blocks 180, and they can anticipate opportunities for new atomic components.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
detecting, using a processor, an arrangement of a plurality of blocks that are interconnected, wherein each block of the plurality of blocks is a physical block representing a corresponding atomic service;
determining, using the processor, whether each atomic service represented by a block in the plurality of blocks is configured to communicate with each other atomic service represented by an other block with which the block is interconnected in the plurality of blocks;
based at least in part on determining that each atomic service represented by a block in the plurality of blocks is configured to communicate with each other atomic service represented by an other block with which the block is interconnected in the plurality of blocks, defining a microservice represented by the arrangement of the plurality of blocks; and
deploying the microservice.

2. The computer-implemented method of claim 1, further comprising:
based at least in part on determining that a first atomic service represented by a first block in the plurality of blocks is not configured to communicate with a second atomic service represented by a second block interconnected with the first block, notifying of an error.

3. The computer-implemented method of claim 1, wherein the detecting the arrangement of the plurality of blocks that are interconnected comprises receiving from each block an indication of which other blocks are connected to the block.

4. The computer-implemented method of claim 1, further comprising:
detecting a new arrangement of the plurality of blocks; and
defining a new microservice based on the new arrangement of the plurality of blocks.

5. The computer-implemented method of claim 1, wherein each corresponding atomic service of each of the plurality of blocks exists in a cloud, and further comprising:

detecting from the cloud a change to a first atomic service represented by a first block of the plurality of blocks; and updating metadata associated with the first block, responsive to the change to the first atomic service.

6. The computer-implemented method of claim 1, wherein each block of the plurality of blocks comprises one or more sensors for detecting which other blocks of the plurality of blocks are connected to the block.

7. The computer-implemented method of claim 6, wherein the plurality of blocks are color-coded according to the atomic services represented by the plurality of blocks, and wherein the one or more sensors of each block detect a color or each other block connected to the block.

8. A system comprising:
a memory having computer-readable instructions; and
one or more processors for executing the computer-readable instructions, the computer-readable instructions comprising:
detecting an arrangement of a plurality of blocks that are interconnected, wherein each block of the plurality of blocks is a physical block representing a corresponding atomic service;
determining whether each atomic service represented by a block in the plurality of blocks is configured to communicate with each other atomic service represented by an other block with which the block is interconnected in the plurality of blocks;
based at least in part on determining that each atomic service represented by a block in the plurality of blocks is configured to communicate with each other atomic service represented by an other block with which the block is interconnected in the plurality of blocks, defining a microservice represented by the arrangement of the plurality of blocks; and
deploying the microservice.

9. The system of claim 8, the computer-readable instructions further comprising:
based at least in part on determining that a first atomic service represented by a first block in the plurality of blocks is not configured to communicate with a second atomic service represented by a second block interconnected with the first block, notifying of an error.

10. The system of claim 8, wherein the detecting the arrangement of the plurality of blocks that are interconnected comprises receiving from each block an indication of which other blocks are connected to the block.

11. The system of claim 8, the computer-readable instructions further comprising:
detecting a new arrangement of the plurality of blocks; and
defining a new microservice based on the new arrangement of the plurality of blocks.

12. The system of claim 8, wherein each corresponding atomic service of each of the plurality of blocks exists in a cloud, and the computer-readable instructions further comprising:
detecting from the cloud a change to a first atomic service represented by a first block of the plurality of blocks; and
updating metadata associated with the first block, responsive to the change to the first atomic service.

13. The system of claim 8, wherein each block of the plurality of blocks comprises one or more sensors for detecting which other blocks of the plurality of blocks are connected to the block.

14. The system of claim 13, wherein the plurality of blocks are color-coded according to the atomic services represented by the plurality of blocks, and wherein the one or more sensors of each block detect a color or each other block connected to the block.

15. A computer-program product for composing a microservice, the computer-program product comprising a computer-readable storage medium having program instructions embodied therewith, the program instructions executable by a processor to cause the processor to perform a method comprising:
detecting an arrangement of a plurality of blocks that are interconnected, wherein each block of the plurality of blocks is a physical block representing a corresponding atomic service;
determining whether each atomic service represented by a block in the plurality of blocks is configured to communicate with each other atomic service represented by an other block with which the block is interconnected in the plurality of blocks;
based at least in part on determining that each atomic service represented by a block in the plurality of blocks is configured to communicate with each other atomic service represented by an other block with which the block is interconnected in the plurality of blocks, defining a microservice represented by the arrangement of the plurality of blocks; and
deploying the microservice.

16. The computer-program product of claim 15, the method further comprising:
based at least in part on determining that a first atomic service represented by a first block in the plurality of blocks is not configured to communicate with a second atomic service represented by a second block interconnected with the first block, notifying of an error.

17. The computer-program product of claim 15, wherein the detecting the arrangement of the plurality of blocks that are interconnected comprises receiving from each block an indication of which other blocks are connected to the block.

18. The computer-program product of claim 15, wherein each corresponding atomic service of each of the plurality of blocks exists in a cloud, and the method further comprising:
detecting from the cloud a change to a first atomic service represented by a first block of the plurality of blocks; and
updating metadata associated with the first block, responsive to the change to the first atomic service.

19. The computer-program product of claim 15, wherein each block of the plurality of blocks comprises one or more sensors for detecting which other blocks of the plurality of blocks are connected to the block.

20. The computer-program product of claim 19, wherein the plurality of blocks are color-coded according to the atomic services represented by the plurality of blocks, and wherein the one or more sensors of each block detect a color or each other block connected to the block.

* * * * *